(12) United States Patent
Leone et al.

(10) Patent No.: US 10,370,238 B2
(45) Date of Patent: Aug. 6, 2019

(54) REFUELING SYSTEMS AND METHODS FOR MIXED LIQUID AND GASEOUS FUEL

(71) Applicant: Ford Global Technologies, LLC, Dearborn, MI (US)

(72) Inventors: Thomas G. Leone, Ypsilanti, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/299,287

(22) Filed: Oct. 20, 2016

(65) Prior Publication Data

US 2017/0036904 A1    Feb. 9, 2017

Related U.S. Application Data

(62) Division of application No. 14/051,312, filed on Oct. 10, 2013, now Pat. No. 9,527,718.

(51) Int. Cl.
*B67D 7/04* (2010.01)
*B67D 7/78* (2010.01)
(Continued)

(52) U.S. Cl.
CPC .......... *B67D 7/04* (2013.01); *B60K 15/03006* (2013.01); *B67D 7/0478* (2013.01);
(Continued)

(58) Field of Classification Search
CPC .......... B67D 7/04; B67D 7/0478; B67D 7/78; F02B 43/10; F02B 43/12; F02B 2043/103;
(Continued)

(56) References Cited

U.S. PATENT DOCUMENTS 4,683,861 A * 8/1987 Breitkreuz ............ F02D 41/004
123/458
4,699,638 A * 10/1987 Harris .................... B60K 15/04
141/286
(Continued)

FOREIGN PATENT DOCUMENTS

CN      101191447 A      6/2008
CN      101289062 A     10/2008
(Continued)

OTHER PUBLICATIONS

Lannug, Axel, et al., "The Solubility of Methane of Hydrocarbons, Alcohols, Water and Other Solvents," ACTA Chemica Scandinavica 14, pp. 1124-1128, Copenhagen, Denmark, 1960, 5 pages.
(Continued)

*Primary Examiner* — Nicolas A Arnett
(74) *Attorney, Agent, or Firm* — Julia Voutyras; McCoy Russell LLP

(57) ABSTRACT

A fuel tank system, comprising: a fuel tank configured to store a liquid fuel and a pressurized gaseous fuel capable of partially dissolving in the liquid fuel; a refueling conduit coupled to the fuel tank via a tank access valve; a first high pressure refueling port coupled to the refueling conduit; a low pressure refueling port coupled to the refueling conduit via a check valve. In this way, pressurized gaseous fuel or a pre-pressurized mix of fuels may be added to the fuel tank without active control any time the fuel pressure in the fuel tank is below a maximum allowable pressure, and liquid fuel may be added to the fuel tank with active control whenever the fuel pressure and liquid fuel level in the fuel tank are below threshold levels.

17 Claims, 5 Drawing Sheets

(51) Int. Cl.
*F02B 43/12* (2006.01)
*B60K 15/03* (2006.01)
*F02B 43/10* (2006.01)

(52) U.S. Cl.
CPC ............... *B67D 7/78* (2013.01); *F02B 43/10* (2013.01); *F02B 43/12* (2013.01); *B60K 2015/03019* (2013.01); *B60K 2015/03026* (2013.01); *F02B 2043/103* (2013.01)

(58) Field of Classification Search
CPC .... B60K 15/03006; B60K 2015/03026; B60K 15/03019
See application file for complete search history.

(56) References Cited

U.S. PATENT DOCUMENTS

| | | | |
|---|---|---|---|
| 5,117,802 A | 6/1992 | Durbin | |
| 5,411,058 A | 5/1995 | Welsh et al. | |
| 5,584,278 A * | 12/1996 | Satoh | B60K 15/03519 123/516 |
| 5,816,224 A | 10/1998 | Welsh et al. | |
| 5,988,232 A * | 11/1999 | Koch | B67D 7/0486 141/59 |
| 6,167,747 B1 * | 1/2001 | Koch | B67D 7/0476 141/59 |
| 6,418,983 B1 * | 7/2002 | Payne | B67D 7/0486 141/47 |
| 6,543,423 B2 | 4/2003 | Dobryden et al. | |
| 6,543,426 B1 * | 4/2003 | Schwochert | B60K 15/03177 123/516 |
| 6,584,780 B2 | 7/2003 | Hibino et al. | |
| 8,082,905 B2 * | 12/2011 | Mai | F02M 25/089 123/518 |
| 8,342,158 B2 | 1/2013 | Ulrey et al. | |
| 8,434,461 B2 * | 5/2013 | Kerns | F02M 25/089 123/520 |
| 8,560,167 B2 * | 10/2013 | Jentz | G01M 3/025 180/441 |
| 8,640,674 B2 | 2/2014 | Sugiyama | |
| 9,255,829 B2 | 2/2016 | Leone et al. | |
| 9,328,677 B2 | 5/2016 | Leone et al. | |
| 9,464,596 B2 | 10/2016 | Leone et al. | |
| 9,527,718 B2 * | 12/2016 | Leone | B67D 7/0478 |
| 10,066,585 B2 * | 9/2018 | Dearth | F02M 33/00 |
| 2003/0221433 A1 | 12/2003 | Gustafson | |
| 2009/0191470 A1 * | 7/2009 | Shirasaki | G03F 1/62 430/5 |
| 2011/0061622 A1 | 3/2011 | Lund | |
| 2011/0240145 A1 * | 10/2011 | Pifer | F16K 17/0413 137/487.5 |
| 2012/0152370 A1 * | 6/2012 | Menke | B60K 15/03 137/14 |
| 2013/0000607 A1 | 1/2013 | Watanabe | |
| 2013/0013183 A1 | 1/2013 | Sumilla et al. | |
| 2013/0112176 A1 * | 5/2013 | Peters | F02M 25/0809 123/521 |
| 2013/0160741 A1 | 6/2013 | Sommars et al. | |
| 2013/0174814 A1 | 7/2013 | Sugiyama | |
| 2014/0026866 A1 * | 1/2014 | Pifher | F02M 33/02 123/520 |
| 2014/0026992 A1 * | 1/2014 | Pearce | B60K 15/035 137/561 R |
| 2015/0114370 A1 * | 4/2015 | Leone | F02D 41/0025 123/575 |
| 2015/0369151 A1 * | 12/2015 | Dudar | F02D 41/0032 141/4 |

FOREIGN PATENT DOCUMENTS

| | | |
|---|---|---|
| CN | 103244288 A | 8/2013 |
| JP | S57163146 A | 10/1982 |
| JP | 2007009778 A | 1/2007 |
| JP | 2007085203 A | 4/2007 |
| JP | 2008184942 A | 8/2008 |
| JP | 2011220208 A | 11/2011 |
| JP | 2012117495 A | 6/2012 |

OTHER PUBLICATIONS

Sebastian, Herbert M., et al., "Correlation of the Solubility of Methane in Hydrocarbon Solvents," Ind. Eng. Chem. Fundam., 1981, vol. 20, No. 4, pp. 346-349, American Chemical Society, 4 pages.

State Intellectual Property Office of the People's Republic of China, Office Action and Search Report Issued in Application No. 201510237426.3, dated Jan. 22, 2019, 13 pages. (Submitted with Partial Translation).

* cited by examiner

REFUELING SYSTEMS AND METHODS FOR MIXED LIQUID AND GASEOUS FUEL

CROSS REFERENCE TO RELATED APPLICATION

The present application is a divisional application of U.S. patent application Ser. No. 14/051,312, entitled "REFUELING SYSTEMS AND METHODS FOR MIXED LIQUID AND GASEOUS FUEL," filed on Oct. 10, 2013, the entire contents of which are incorporated herein by reference for all purposes.

BACKGROUND AND SUMMARY

Compressed natural gas (CNG) is a high octane fuel that is beneficial for reducing engine knock, for reducing hydrocarbon emissions in cold start events, and for reducing carbon dioxide emissions during engine operations. However, CNG has a low energy density compared to liquid hydrocarbon fuels, such as diesel fuel or gasoline. This typically requires packaging of CNG in cryogenic quality tanks (as liquified natural gas (LNG)) or in high pressure tanks (approximately 200-250 atmospheres).

To increase the range and total fuel quantity stored in a vehicle, CNG may be utilized in conjunction with gasoline or diesel fuel, requiring the vehicle to switch between fuels for optimal performance. However, space constraints do not allow for the inclusion of separate fuel tanks to all vehicles. A preferable system may be one that stores liquid fuel and pressurized gaseous fuel together in a single tank. In particular, CNG is able to partially dissolve in gasoline or diesel fuel when stored together at a relatively low pressure (~100 atm).

Storing a mix of pressurized gaseous fuel and low pressure liquid fuel within a single tank presents challenges for refueling. It may be possible to add liquid fuel to the tank first, then pressurize the tank with pressurized gaseous fuel, or to add a pre-pressurized fuel mix. However, it may not always be practical to empty the tank completely before refueling, and pre-pressurized fuel mixtures may not always be available at refueling stations. Current refueling systems do not allow for the addition of either pressurized gaseous fuel or low pressure liquid fuel or a pre-pressurized fuel mix to a single tank when refueling and/or as fuel is available at refueling stations.

The inventors herein have recognized the above problems, and developed systems and methods to at least partially address these issues. In one example, a fuel tank system, comprising: a fuel tank configured to store a liquid fuel and a pressurized gaseous fuel capable of partially dissolving in the liquid fuel; a refueling conduit coupled to the fuel tank via a tank access valve; a first high pressure refueling port coupled to the refueling conduit; a low pressure refueling port coupled to the refueling conduit via a check valve. In this way, pressurized gaseous fuel or a pre-pressurized mix of fuels may be added to the fuel tank without active control any time the fuel pressure in the fuel tank is below a maximum allowable pressure, and liquid fuel may be added to the fuel tank with active control whenever the fuel pressure and liquid fuel level in the fuel tank are below threshold levels.

In another example, a method for refueling a vehicle fuel tank, comprising: responsive to a first condition, pumping liquid fuel from a surge tank into a fuel tank, while storing a liquid fuel and a pressurized gaseous fuel only partially dissolved in the liquid fuel in the tank. In this way, liquid fuel can be added to a fuel tank without requiring the tank pressure to approach zero, allowing for more opportunities to add liquid fuel to the fuel tank.

In yet another example, a method for refueling a vehicle fuel tank, comprising: responsive to a first condition, pumping gaseous fuel from a fuel tank into a secondary vapor tank, while storing a liquid fuel and a pressurized gaseous fuel only partially dissolved in the liquid fuel in the tank. In this way, a mixed fuel tank may be relieved of a high pressure, allowing for the addition of liquid fuel without combusting additional gaseous fuel.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically depicts an example embodiment of a cylinder of an internal combustion engine.

DETAILED DESCRIPTION

Figure 1:
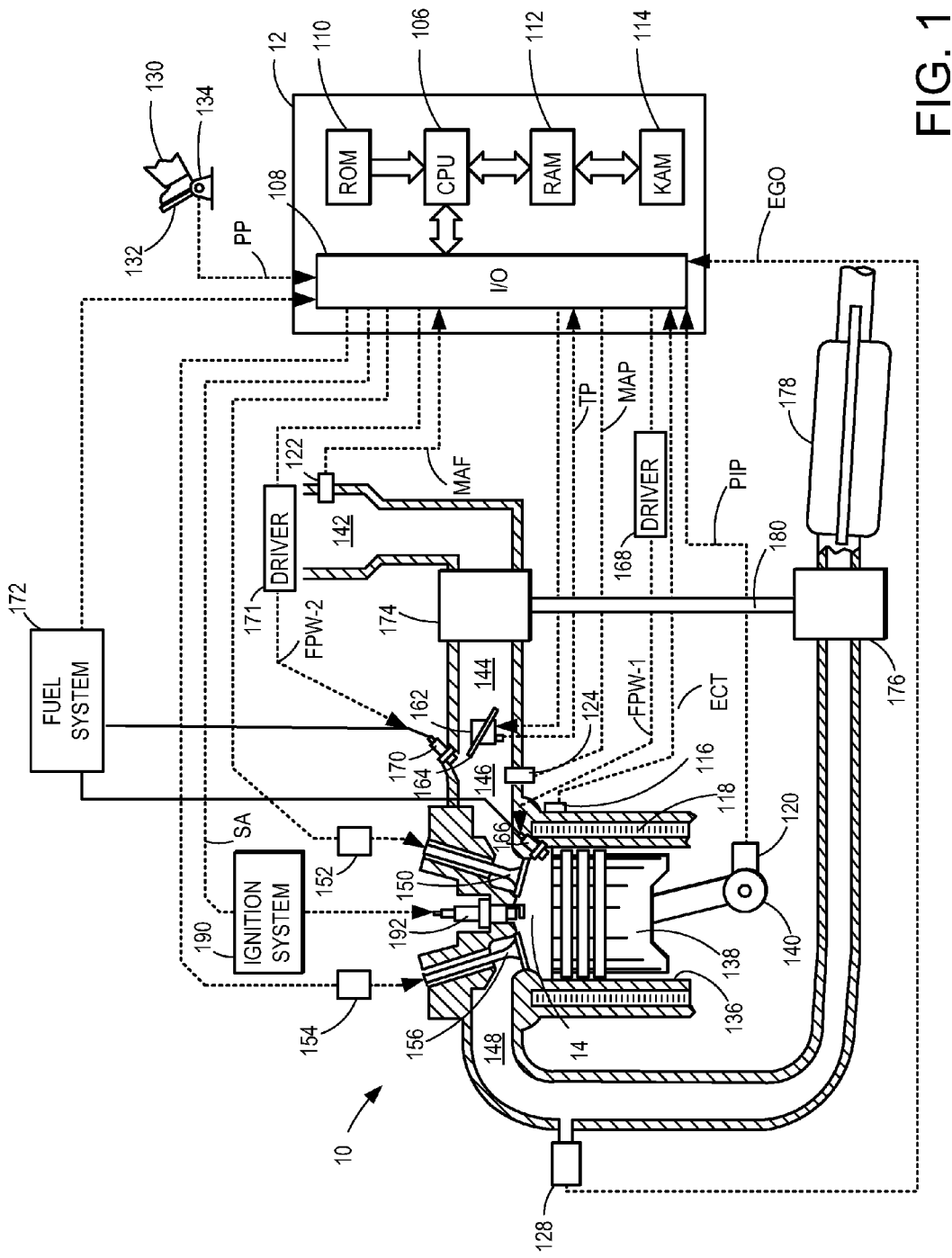
Figure 2:
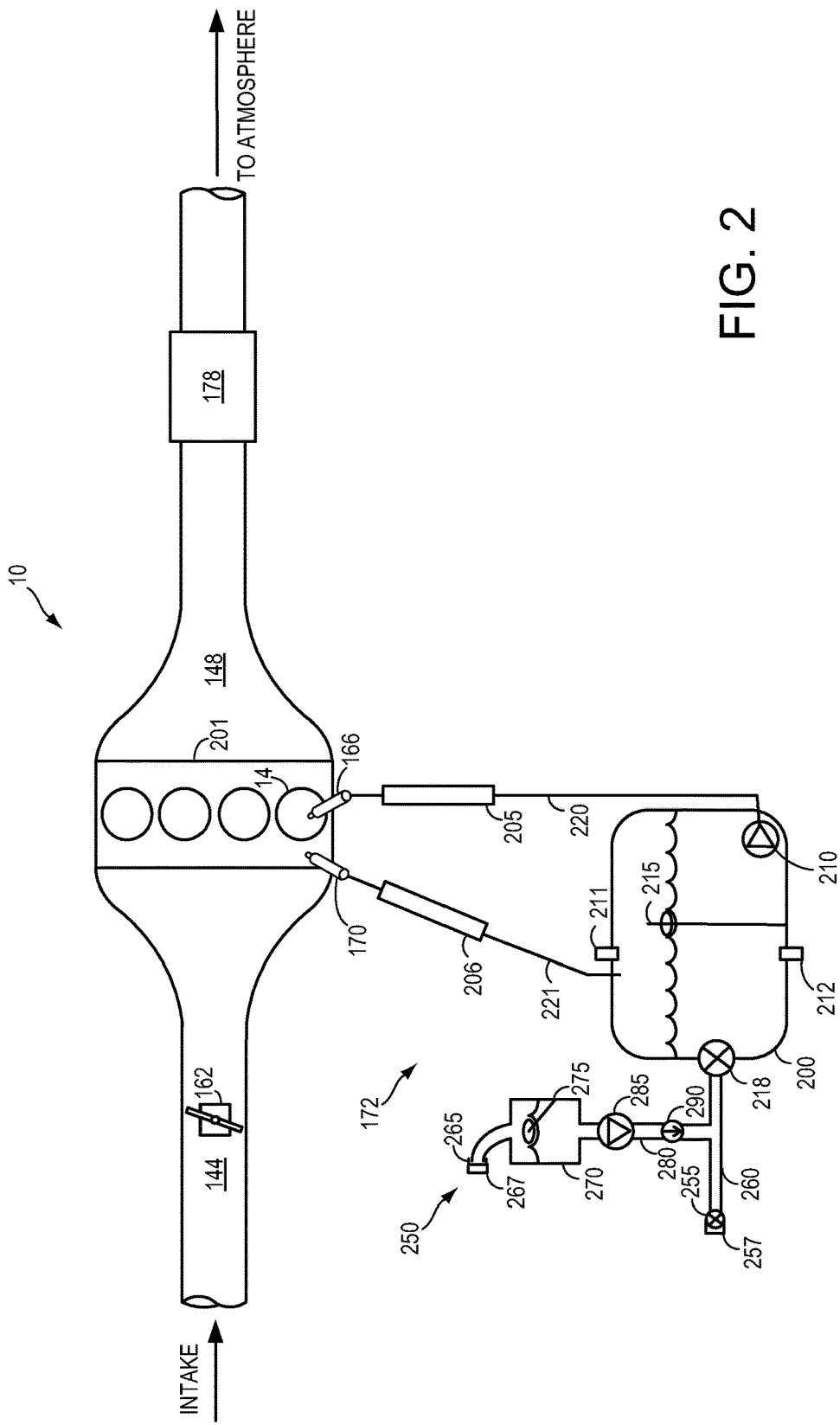
FIG. 2 shows a schematic depiction of an engine and fuel system configured to operate on a mix of gaseous fuel and liquid fuel.
Figure 3:
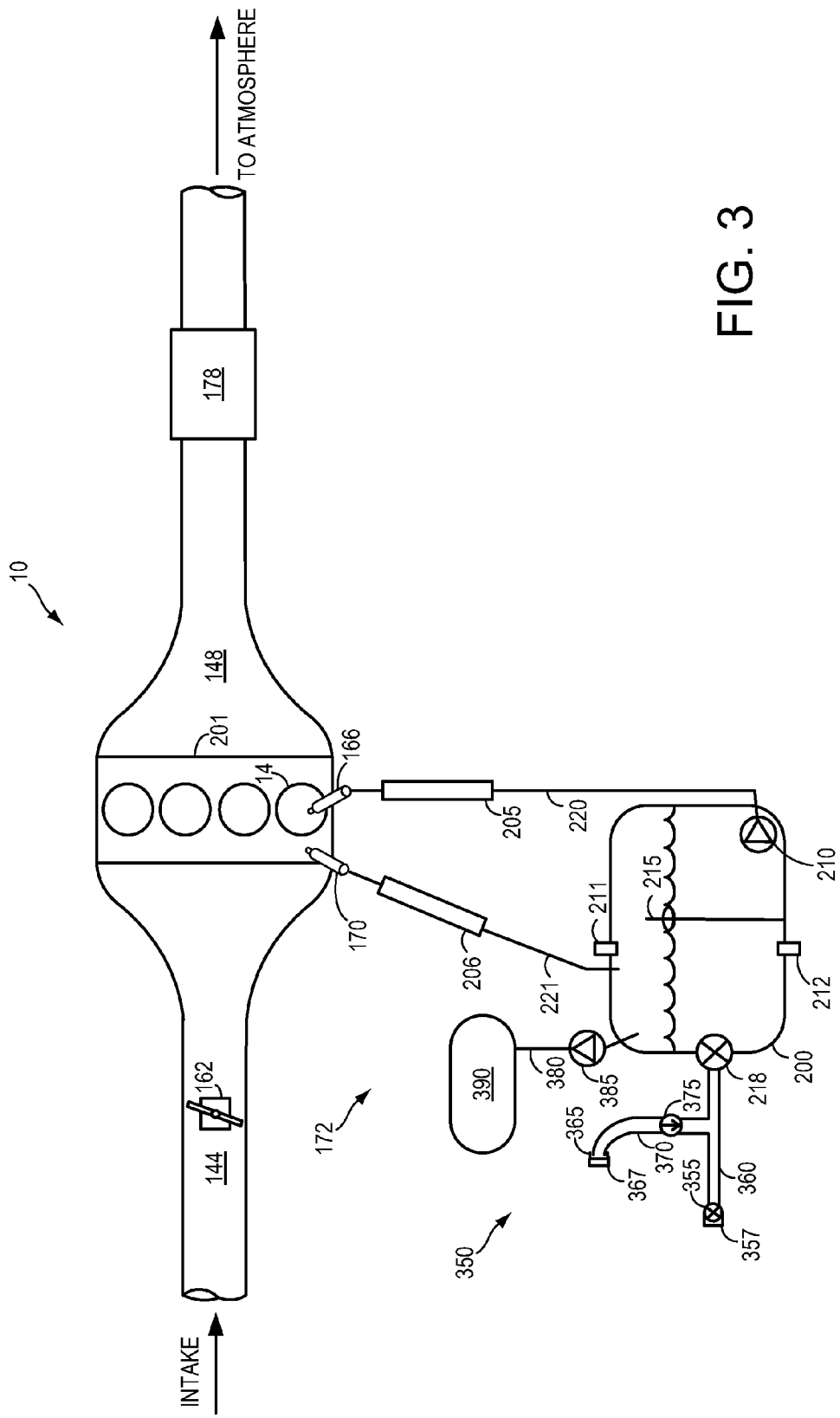
FIG. 3 shows a schematic depiction of an alternate engine and system configured to operate on a mix of gaseous fuel and liquid fuel.
Figure 4:
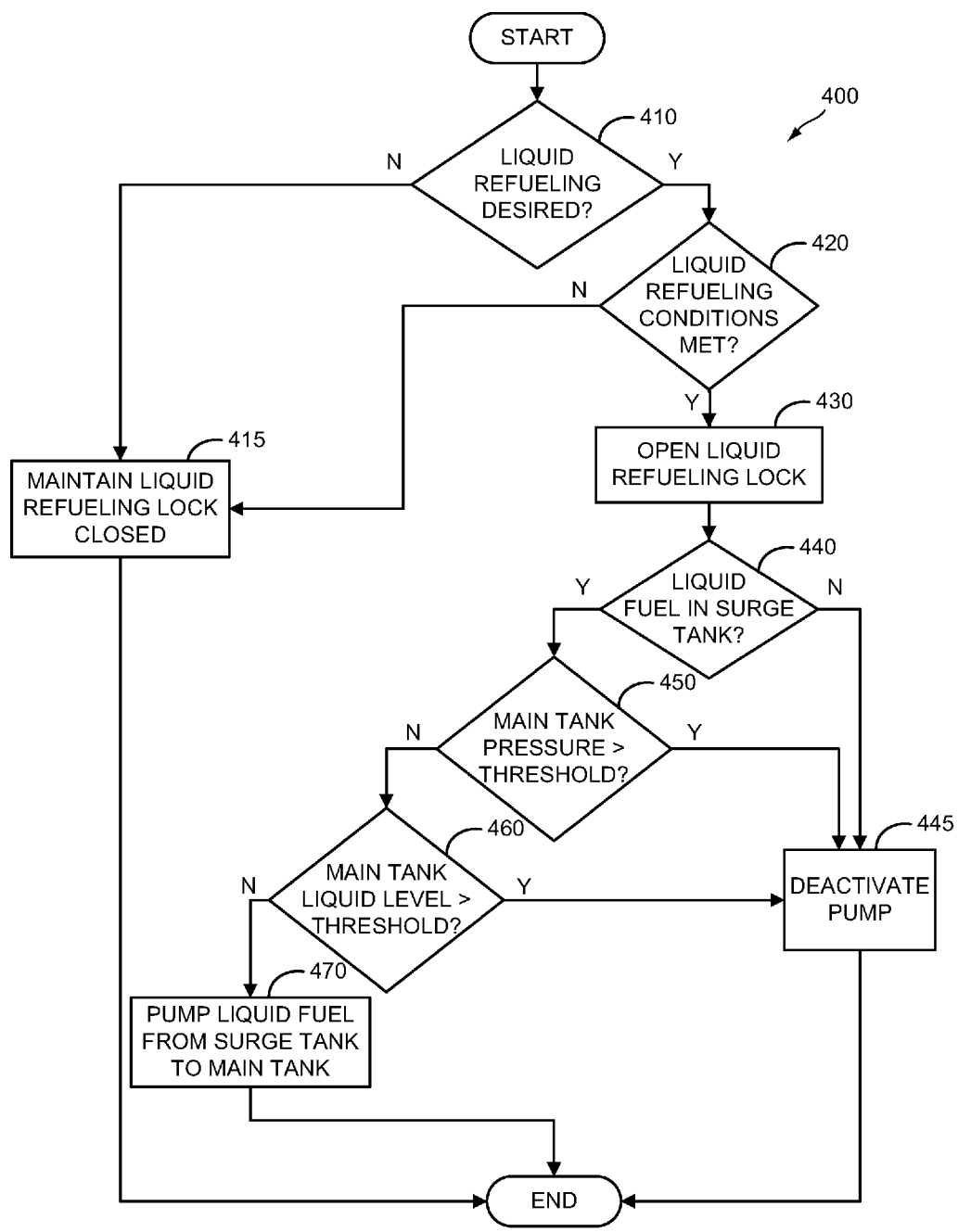
FIG. 4 shows an example high level flowchart for refueling the engine system of FIG. 2 with liquid fuel.
Figure 5:
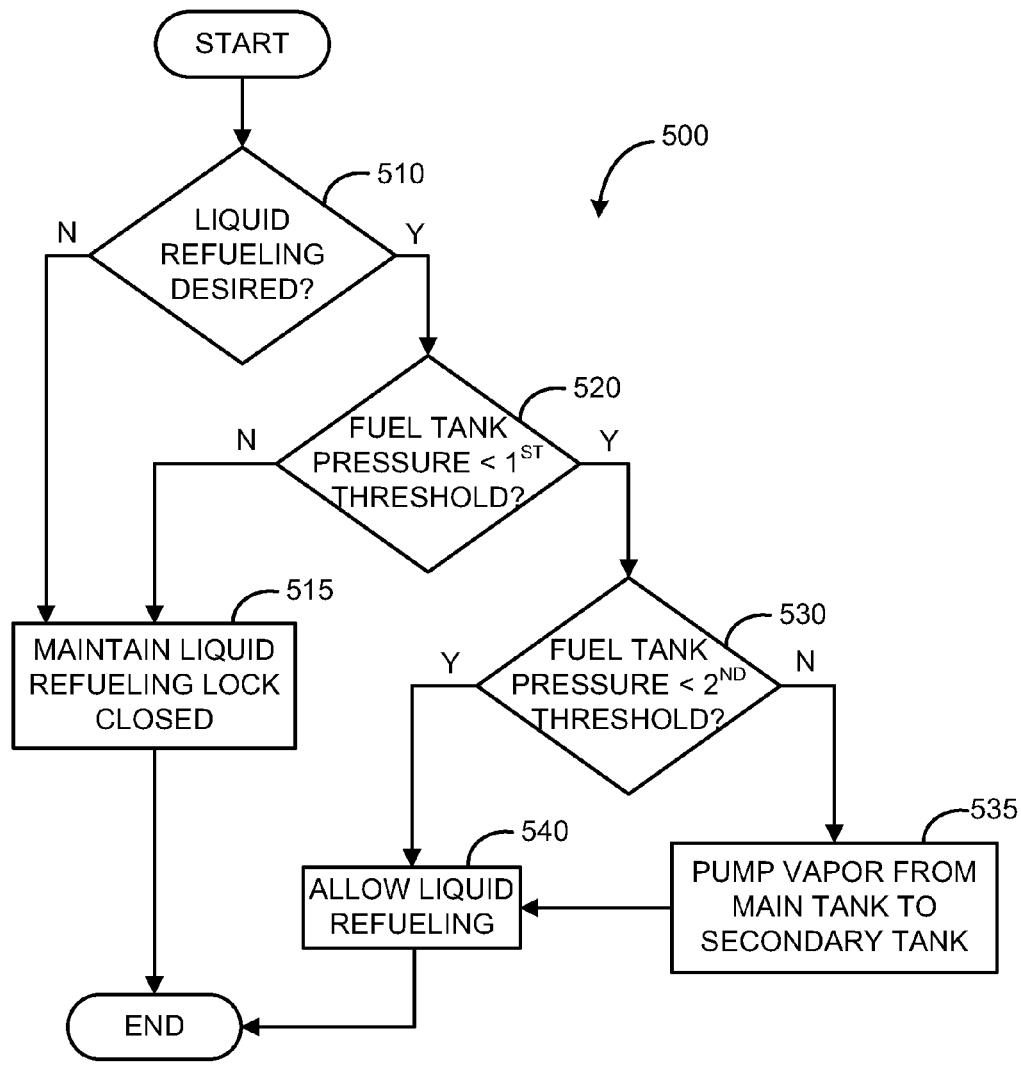
FIG. 5 shows and example high level flowchart for refueling the engine system of 3 with liquid fuel.

The present description relates to systems and methods for refueling a vehicle or an engine system including a fuel system that operates on both liquid fuel and gaseous fuel, the two fuels stored together in a high pressure fuel tank. The engine system may include a cylinder configured with both a port fuel injector and a direct fuel injector as shown in FIG. 1. The engine system may include a multi-cylinder engine coupled to a fuel system with a refueling system as depicted in FIG. 2. Alternatively, the engine system may include a refueling system as depicted in FIG. 3. FIG. 4 illustrates a method for adding liquid fuel to the engine system of FIG. 2. Additionally, FIG. 5 illustrates a method for adding liquid fuel to the engine system of FIG. 3.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank that holds a liquid fuel, such as gasoline, and also holds a gaseous fuel, such as CNG. Fuel injectors 166 and 170 may be configured to inject fuel from the same fuel tank, from different fuel tanks, from a plurality of the same fuel tanks, or from an overlapping set of fuel tanks. While FIG. 1 depicts fuel injector 166 as a direct fuel injector and fuel injector 170 as a port fuel injector, in other embodiments both injectors 166 and 170 may be configured as port fuel injectors or may both be configured as direct fuel injectors.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines that may be performed by the controller are described herein and with regards to FIGS. 3 and 4.

FIG. 2 shows a schematic diagram of a multi-cylinder engine in accordance with the present disclosure. As depicted in FIG. 1, internal combustion engine 10 includes cylinders 14 coupled to intake passage 144 and exhaust passage 148. Intake passage 144 may include throttle 162. Exhaust passage 148 may include emissions control device 178.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166 and 170. Although only one cylinder is shown coupled to fuel injectors, it is to be understood that all cylinders 14 included in cylinder head 201 may also be coupled to one or more fuel injectors. In this example embodiment, fuel injector 166 is depicted as a direct fuel injector and fuel injector 170 is depicted as a port fuel injector. Each fuel injector may be configured to deliver a specific quantity of fuel at a specific time point in the engine cycle in response to commands from controller 12. One or both fuel injectors may be utilized to deliver combustible fuel to cylinder 14 during each combustion cycle. The timing and quantity of fuel injection may be controlled as a function of engine operating conditions.

Fuel system 172 includes fuel tank 200. Fuel tank 200 may include a liquid fuel, such as gasoline, diesel fuel, or a gasoline-alcohol blend (e.g. E10, E85, M15, or M85), and may also include a gaseous fuel, such as CNG. Fuel tank 200 may be configured to store liquid fuel and gaseous fuel together at a relatively low pressure compared to conventional CNG storage (e.g. 200-250 atmospheres). For example, the gaseous fuel may be added to a pressure of 100 atmospheres. In this way, a portion of the gaseous fuel may be dissolved in the liquid fuel. At 100 atmospheres, CNG may dissolve in gasoline to the point where 40% of the liquid fuel component in fuel tank 200 is CNG. Fuel tank 200 may include pressure sensor 211, temperature sensor 212, and liquid level sensor 215.

Fuel injector 166 may be coupled to fuel tank 200 in a configuration where liquid fuel stored in fuel tank 200 is delivered to fuel injector 166. Fuel injector 166 is shown coupled to fuel rail 205. Fuel rail 205 may be coupled to fuel line 220. Fuel rail 205 may include one or more sensors, such as pressure or temperature sensors. Fuel line 220 is coupled to fuel tank 200. Fuel line 220 may be coupled to a lower portion of fuel tank 200 in order draw liquid fuel from fuel tank 200. Fuel line may be coupled to fuel pump 210. In some cases, fuel pump 210 may be omitted from fuel system 172. In such embodiments, the pressure of gaseous fuel stored in fuel tank 200 may be used to drive liquid fuel from fuel tank 200 to fuel rail 205 via fuel line 220. In embodiments where fuel pump 210 is omitted, a liquid fuel valve may be coupled to fuel line 220 to control liquid fuel flow through fuel line 220.

Fuel injector 170 may be coupled to fuel tank 200 in a configuration where gaseous fuel stored in fuel tank 200 is delivered to fuel injector 170. Fuel injector 170 is shown coupled to fuel rail 206. Fuel rail 206 may be coupled to fuel line 221. Fuel rail 206 may include one or more sensors, such as pressure or temperature sensors. Fuel line 221 is coupled to fuel tank 200. Fuel line 221 may be coupled to an upper portion of fuel tank 200 in order to draw gaseous fuel from fuel tank 200. Fuel line 221 may be coupled to one or more fuel pumps. Fuel line 221 may include a line valve, a pressure relief valve, a coalescing filter, and/or a pressure regulator. Fuel rail 206 may be configured to be a higher pressure fuel rail, and fuel rail 205 may be configured to be a lower pressure fuel rail. Fuel rail 205 may be configured to hold liquid fuel at a lower pressure than fuel tank 200. In such embodiments, some gaseous fuel may volatize from the liquid fuel/gaseous fuel emulsion. A pressure relief valve and/or scavenging line may be coupled to fuel rail 205 such that only liquid fuel is injected through fuel injector 166, and such that the gaseous fuel is removed and/or recycled from fuel system 172. In some embodiments, both fuel injectors 166 and 170 may be port fuel injectors, or both may be direct fuel injectors. Alternatively, liquid fuel injector 166 may be configured as a port fuel injector and gaseous fuel injector 170 may be a direct fuel injector.

Fuel system 172 is shown coupled to refueling system 250. Refueling system 250 may be coupled to fuel tank 200 via tank access valve 218. Tank access valve 218 may be coupled to refueling conduit 260. Refueling conduit 260 may include high pressure refueling port 255. High pressure refueling port 255 may be configured to receive a pressurized gaseous fuel pump nozzle, or a fuel pump nozzle configured to deliver a pre-pressured mixture of liquid fuel and gaseous fuel. In some cases, a second high pressure refueling port may be included to allow compatibility with more than one type of high pressure fuel pump nozzle.

Access to high pressure refueling port 255 may be regulated by refueling lock 257. In some embodiments, refueling lock 257 may be a fuel cap locking mechanism. The fuel cap locking mechanism may be configured to automatically lock a fuel cap in a closed position so that the fuel cap cannot be opened. For example, the fuel cap may remain locked via refueling lock 257 while pressure in the fuel tank is greater than a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 257 may be a filler pipe valve located at a mouth of refueling conduit 260. In such embodiments, refueling lock 257 may prevent the insertion of a refueling pump into refueling conduit 260. The filler pipe valve may be electrically locked, for example by a solenoid, or mechanically locked, for example by a pressure diaphragm.

In some embodiments, refueling lock 257 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 257 is locked using an electrical mechanism, refueling lock 257 may be unlocked by commands from controller 12, for example, when a fuel tank pressure decreases below a pressure threshold. In embodiments where refueling lock 257 is locked using a mechanical mechanism, refueling lock 257 may be unlocked via a pressure gradient, for example, when a fuel tank pressure decreases below a threshold.

Refueling conduit 260 may be coupled to low pressure refueling conduit 280. Low pressure refueling conduit 280 may be coupled to surge tank 270. Surge tank 270 may include a low pressure refueling port 265 and a liquid sensor 275. Low pressure refueling conduit 280 may include fuel pump 285 and check valve 290. Fuel pump 285 may only operate when fuel tank pressure is below a threshold, and may only operate when there is liquid fuel in surge tank 270, as sensed by liquid sensor 275. In this way, fuel pump 285 may not pump an air/fuel mixture into fuel tank 200. Further, when fuel tank pressure reaches a threshold, fuel pump 285 may be shut off by controller 12, causing liquid fuel to accumulate in surge tank 270. This may cause a low pressure liquid fuel dispenser nozzle engaged with low pressure refueling port 265 to turn itself off. Access to refueling port 265 may be regulated by refueling lock 267. Refueling lock 267 may be comprise one of the examples described for refueling lock 257. Refueling locks 257 and 267 may comprise different mechanisms, and may be responsive to different tank pressure thresholds. An example refueling routine for the system depicted in FIG. 2 is described herein and with regards to FIG. 4.

FIG. 3 shows an alternative schematic diagram of a multi-cylinder engine in accordance with the present disclosure. As described herein and depicted in FIG. 2, multicylinder engine 10 includes cylinders 14 coupled to intake passage 144 and exhaust passage 148, and further coupled to fuel system 172. Fuel system 172 is configured to store a mixture of liquid fuel and pressurized gaseous fuel in fuel tank 200, and further to deliver liquid fuel to direct fuel injector 166 and to deliver gaseous fuel to port fuel injector 170. As described herein and with regards to FIG. 2, some embodiments may include fuel injectors 166 and 170 in different configurations than the configuration depicted in FIG. 3. In the embodiment shown in FIG. 3, fuel system 172 is coupled to refueling system 350.

In the embodiment depicted in FIG. 3, refueling system 350 is coupled to fuel tank 200 via tank access valve 218. Tank access valve 218 may be coupled to refueling conduit 360. Refueling conduit 360 may include high pressure refueling port 355. High pressure refueling port 355 may be configured to receive a pressurized gaseous fuel pump nozzle, or a fuel pump nozzle configured to deliver a pre-pressured mixture of liquid fuel and gaseous fuel. In some embodiments, a second high pressure refueling port may be included to allow compatibility with more than one type of high pressure fuel pump nozzles. In some embodiments, access to high pressure refueling port 355 may be regulated by refueling lock 357.

Refueling conduit 360 may be coupled to low pressure refueling conduit 370. Low pressure refueling conduit 370 may include low pressure refueling port 365 and check valve 375. Access to low pressure refueling port 365 may be regulated by refueling lock 367. Optionally, a secondary tank 390 may be coupled to fuel tank 200 via gaseous fuel line 380. Pump 385 may be coupled to gaseous fuel line 380. Pump 385 may be activated to pump gaseous fuel out of fuel tank 200 and into secondary tank 390. In the absence of secondary tank 390, liquid may only be added to fuel tank 200 when pressure in fuel tank 200 is at or near zero. If a positive pressure exists in fuel tank 200, check valve 375 will force liquid fuel entering low pressure refueling port 365 to quickly fill low pressure refueling conduit 370, causing a low pressure liquid fuel dispenser nozzle engaged with low pressure refueling port 365 to turn itself off.

However, when secondary tank 390 is included in refueling system 350, fuel tank 200 may be actively depressurized to allow refueling with low pressure liquid fuel. Pump 385 may be activated to pump gaseous fuel or fuel vapor into secondary tank 390. Upon the tank pressure in fuel tank 200 decreasing below a threshold, refueling with low pressure liquid fuel may be allowed, for example by unlocking refueling lock 367. An example refueling routine for the system depicted in FIG. 3 is described herein and with respect to FIG. 5.

FIG. 4 depicts an example routine 400 for a high-level method for refueling a mixed liquid hydrocarbon/gaseous fuel system. In particular, routine 400 describes a method for liquid fuel refueling in a mixed fuel system. Routine 400 will be described herein with reference to the components and systems depicted in FIGS. 1 and 2, though the method may be applied to other systems without departing from the scope of this disclosure. Routine 400 may be carried out by controller 12, and may be stored as executable instructions in non-transitory memory.

Routine 400 may begin at 410 by determining whether liquid refueling is desired. Determining whether liquid refueling is desired may include direct or indirect liquid refueling requests from the vehicle operator. Direct refueling requests may include explicit operator requests made through an interface or detection of an operator opening a refueling door. Indirect liquid refueling requests may include the detection of a proximity to a refueling station. Proximity to a refueling station may be determined through GPS or other location data, or based on direct communication between the vehicle and refueling station. If no direct or indirect liquid refueling request is detected, method 400 may proceed to 415. At 415, method 400 may include maintaining liquid refueling lock 267 closed. Method 400 may then end.

If a direct or indirect liquid refueling request is detected at 410, method 400 may proceed to 420. At 420, method 400 may include determining whether conditions suitable for liquid refueling are met. Liquid refueling conditions may include a fuel tank pressure being below a threshold and/or a fuel tank liquid level being below a threshold. Fuel tank pressure may be measured by a pressure sensor, such as pressure sensor 211. Fuel tank liquid level may be measured by a liquid level sensor, such as liquid level sensor 215. Other conditions, such as fuel tank temperature, ambient temperature, atmospheric pressure, etc. may be gauged to determine whether liquid fuel can be added to fuel tank 200. If liquid refueling conditions are not met (e.g. fuel tank pressure is above a threshold) method 400 may proceed to 415. At 415, method 400 may include maintaining liquid refueling lock 267 closed. Method 400 may then end.

If liquid refueling conditions are met at 420, method 400 may proceed to 430. At 430, method 400 may include opening the liquid refueling lock. This may allow the vehicle operator or refueling station attendant to open a refueling door, remove a gas cap, and/or engage a liquid refueling nozzle with low pressure refueling port 265.

Continuing at 440, method 400 may include determining whether there is liquid fuel in the surge tank. For example, the presence of liquid fuel in surge tank 270 may be determined through a liquid sensor, such as liquid sensor 275. If there is no liquid fuel in the surge tank, method 400 may proceed to 445. At 445, method 400 may include deactivating the refueling pump, such as fuel pump 285 as shown in FIG. 2. If the refueling pump is not currently active, the fuel pump may be maintained in an inactive state. Method 400 may then end.

If there is liquid fuel in the surge tank, as determined at 440, method 400 may proceed to 450. At 450, method 400 may include determining whether pressure in the main fuel tank is greater than a threshold. Fuel tank pressure may be determined via fuel tank pressure sensor 211. If the fuel tank pressure is greater than the threshold, method 400 may proceed to 445. At 445, method 400 may include deactivating the refueling pump, such as fuel pump 285 as shown in FIG. 2. If the refueling pump is not currently active, the fuel pump may be maintained in an inactive state. Method 400 may then end.

If fuel tank pressure is less than a threshold, as determined at 450, method 400 may proceed to 460. At 460, method 400 may include determining whether the liquid level in the main fuel tank is above a threshold. Fuel tank liquid level may be determined via fuel tank liquid level sensor 215. If the fuel tank liquid level is greater than the threshold, method 400 may proceed to 445. At 445, method 400 may include deactivating the refueling pump, such as fuel pump 285 as shown in FIG. 2. If the refueling pump is not currently active, the fuel pump may be maintained in an inactive state. Method 400 may then end.

If the fuel tank liquid level is less than a threshold, as determined at 460, method 400 may proceed to 470. At 470, method 400 may include activating the refueling pump, and pumping liquid fuel from the surge tank to the main fuel tank. Pumping liquid fuel from the surge tank to the main fuel tank may continue until there is no longer liquid fuel in the surge tank, until the fuel tank pressure increases above a threshold, and/or until the fuel tank liquid level increases above a threshold. Method 400 may iterate from 440 to 470 in order to accomplish fuel tank filling. In some embodiments controller 12 may determine an amount of fuel which may be added to fuel tank 200 without increasing above a pressure threshold or a liquid level threshold, and continue operation of fuel pump 285 until the predetermined amount of fuel has been added to the fuel tank, as long as liquid fuel remains in the surge tank. Method 400 may then end.

The systems described herein and depicted in FIGS. 1 and 2 and the methods described herein and depicted in FIG. 4 may enable one or more methods. In one example, a method for refueling a vehicle fuel tank, comprising: responsive to a first condition, pumping liquid fuel from a surge tank into a fuel tank, while storing a hydrocarbon liquid fuel and a pressurized gaseous fuel only partially dissolved in the hydrocarbon liquid fuel in the tank. The first condition may include the detection of a liquid refueling request; a fuel tank pressure that is less than a first threshold; a fuel tank liquid level that is less than a second threshold; and a surge tank liquid level that is greater than a third threshold. The method may further comprise: responsive to a second condition, ceasing the pumping of liquid fuel from the surge tank into the fuel tank. The second condition may include a surge tank liquid level that is less than the third threshold. The technical result of implementing this method is that liquid fuel may be added whenever fuel tank pressure and fuel tank liquid level are below thresholds. Implementing this method may allow liquid fuel to be added to the fuel tank without an air/fuel mixture being added to the fuel tank, thereby avoiding the creation of a combustible mixture within the fuel tank.

FIG. 5 depicts an example routine 500 for a high-level method for refueling a mixed liquid hydrocarbon/gaseous fuel system. In particular, routine 500 describes a method for liquid fuel refueling in a mixed fuel system. Routine 500 will be described herein with reference to the components and systems depicted in FIGS. 1 and 3, though the method may be applied to other systems without departing from the scope of this disclosure. Routine 500 may be carried out by controller 12, and may be stored as executable instructions in non-transitory memory.

Routine 500 may begin at 510 by determining whether liquid refueling is desired. Determining whether liquid refueling is desired may include direct and/or indirect liquid refueling requests from the vehicle operator. Direct refueling requests may include explicit operator requests made through an interface or detection of an operator opening a refueling door. Indirect liquid refueling requests may include the detection of a proximity to a refueling station. Proximity to a refueling station may be determined through GPS or other location data, or based on direct communication between the vehicle and refueling station. If no direct or indirect liquid refueling request is detected, method 500 may proceed to 515. At 515, method 500 may include maintaining liquid refueling lock 367 closed. For example this may include maintaining engagement of a refueling door with a latch via an electromechanical actuator through a continued signal from a controller. Method 500 may then end.

If a direct or indirect liquid refueling request is detected at 510, method 500 may proceed to 520. At 520, method 500 may include determining whether pressure in the main fuel tank is less than a first threshold. Fuel tank pressure may be determined via fuel tank pressure sensor 211. If the fuel tank pressure is greater than the first threshold, method 500 may proceed to 515. At 515, method 500 may include maintaining liquid refueling lock 367 closed. Method 500 may then end.

If the fuel tank pressure is less than the first threshold, as determined at 520, method 500 may proceed to 530. At 530, method 500 may include determining whether the pressure in the main fuel tank is less than a second threshold, the second threshold being a lower pressure threshold than the first threshold. The second threshold may be based on the volume of secondary tank 390, and the amount of gaseous fuel that may be added to secondary tank 390. Fuel tank pressure may be determined via fuel tank pressure sensor 211. If the fuel tank pressure is less than the second threshold, method 500 may proceed to 540. At 540, method 500 may include allowing liquid refueling. Allowing liquid refueling may include opening liquid refueling lock 367. Allowing liquid refueling may also or alternatively include signaling to the vehicle operator or liquid fuel station attendant through an interface, indicating that liquid refueling is allowed. Liquid refueling may continue until a fuel tank pressure or fuel tank liquid level reaches a threshold, until liquid fuel backs up to check valve 375, or until a liquid fuel dispensing nozzle is disengaged from liquid refueling port 365. Method 500 may then end.

If the fuel tank pressure is less than the first threshold and greater than the second threshold, as determined at 520 and 530, method 500 may proceed to 535. At 535, method 500 may include pumping vapor from the main tank to the secondary tank. Pumping vapor from the main tank to the secondary tank may include activating pump 385. Pumping vapor from the main tank to the secondary tank may continue until a pressure in fuel tank 200 decreases below the second threshold, and/or until secondary tank 390 is filled. In some embodiments, pump 385 may be omitted from refueling system 350. In these embodiments, a valve may be opened to allow gaseous fuel and/or fuel vapor to proceed to secondary tank 390 from fuel tank 200 via gaseous fuel line 380.

Following the pumping of vapor into secondary tank 390, method 500 may proceed to 540. At 540, method 500 may include allowing liquid refueling. Allowing liquid refueling may include opening liquid refueling lock 367. Allowing liquid refueling may also or alternatively include signaling to the vehicle operator or liquid fuel station attendant through an interface, indicating that liquid refueling is allowed. Liquid refueling may continue until a fuel tank pressure or fuel tank liquid level reaches a threshold, until liquid fuel backs up to check valve 375, or until a liquid fuel dispensing nozzle is disengaged from liquid refueling port 365. Method 500 may then end.

The systems described herein and depicted in FIGS. 1 and 3 and the methods described herein and depicted in FIG. 5 may enable one or more methods. In one example, a method for refueling a vehicle fuel tank, comprising: responsive to a first condition, pumping gaseous fuel from a fuel tank into a secondary vapor tank, while storing a hydrocarbon liquid fuel and a pressurized gaseous fuel only partially dissolved in the hydrocarbon liquid fuel in the tank. The first condition may include the detection of a liquid refueling request; and a fuel tank pressure that is less than a first threshold, but greater than a second threshold, the second threshold less than the first threshold. The method may further comprise: responsive to a second condition, ceasing the pumping of gaseous fuel from the fuel tank into the secondary vapor tank; and enabling the addition of liquid fuel to the fuel tank. The second condition may include a fuel tank pressure that is less than the second threshold. The technical result of implementing this method is a refueling strategy that allows for the addition of liquid fuel to a fuel tank, even under conditions where the fuel tank pressure is above a maximally allowable threshold. In this way, liquid fuel may be added to the tank when available for refueling, without requiring the combustion of additional gaseous fuel.

The systems described herein and depicted in FIGS. 1, 2, and 3 and the methods described herein and depicted in FIGS. 4 and 5 may enable one or more systems. In one example, fuel tank system, comprising: a fuel tank configured to store a hydrocarbon liquid fuel and a pressurized gaseous fuel capable of partially dissolving in the hydrocarbon liquid fuel; a refueling conduit coupled to the fuel tank via a tank access valve; a first high pressure refueling port coupled to the refueling conduit; a low pressure refueling port coupled to the refueling conduit via a check valve. The high pressure refueling port may be configured to receive both pressurized gaseous fuel and a pre-pressurized mixture of liquid fuel and gaseous fuel. The system may further comprise a second high pressure refueling port coupled to the refueling conduit, and further, the first high pressure refueling port may be configured to receive pressurized gaseous fuel, and the second high pressure refueling port may be configured to receive a pre-pressurized mixture of liquid fuel and gaseous fuel. The low pressure refueling port may be configured to receive liquid fuel. The system may further comprise a surge tank coupled between the low pressure refueling port and the check valve; a liquid level sensor coupled within the surge tank; and a refueling pump coupled between the surge tank and the check valve. The refueling pump may be configured to: during a first condition, pump liquid fuel contained in the surge tank into the fuel tank. The first condition may include: the detection of a liquid refueling request; a fuel tank pressure that is less than a first threshold; a fuel tank liquid level that is less than a second threshold; and a surge tank liquid level that is greater than a third threshold. The system may further comprise a secondary vapor tank coupled to the fuel tank via a gaseous fuel line; and a depressurizing pump coupled to the gaseous fuel line between the secondary vapor tank and the fuel tank. The depressurizing pump may be configured to: during a first condition, pump gaseous fuel from the fuel tank into the secondary vapor tank. The first condition may include the detection of a liquid refueling request; and a fuel tank pressure that is less than a first threshold, but greater than a second threshold, the second threshold less than the first threshold. The system may further comprise a refueling lock coupled to the low pressure refueling port, the refueling lock configured to allow access to the low pressure refueling port when the fuel tank pressure is below a threshold. The technical result of implementing this system is a single fuel tank storing both liquid fuel and pressurized gaseous fuel that may be refueled with liquid fuel, pressurized gaseous fuel, and/or a pre-pressurized mix of liquid fuel and pressurized gaseous fuel. In this way, a vehicle may obtain the benefits of having both liquid fuel and pressurized gaseous fuel available for combustion, without the need for additional fuel tanks.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for refueling a fuel tank of a vehicle, comprising:
responsive to a first condition, pumping gaseous fuel from the fuel tank into a secondary vapor tank, while storing a liquid fuel and a distinct pressurized gaseous fuel only partially dissolved in the liquid fuel in the fuel tank, wherein during the pumping the secondary vapor tank is fluidically isolated from atmosphere, and wherein the gaseous fuel comprises a first fuel type and the liquid fuel comprises a second fuel type different from the first fuel type.

2. The method of claim 1, where the first condition includes:
a detection of a liquid refueling request; and
a fuel tank pressure that is less than a first threshold, but greater than a second threshold, the second threshold less than the first threshold.

3. The method of claim 2, further comprising:
responsive to a second condition, ceasing pumping of gaseous fuel from the fuel tank into the secondary vapor tank;
fluidically isolating the secondary vapor tank from the fuel tank; and
enabling addition of liquid fuel to the fuel tank.

4. The method of claim 3, where the second condition includes a fuel tank pressure that is less than the second threshold.

5. The method of claim 3, further comprising, during both the first and the second condition, storing the liquid fuel in the fuel tank until the fuel tank pressure is higher than the first threshold or a fuel tank liquid level reaches a threshold level.

6. The method of claim 2, wherein the liquid refueling request is a direct request from an operator received via an interface or via operator opening of a refueling door.

7. The method of claim 2, wherein the liquid refueling request is an indirect request including detection of proximity of a vehicle to a refueling station by GPS or by direct communication between the vehicle and the refueling station.

8. The method of claim 2, wherein the second threshold is based on a volume of the secondary vapor tank and an amount of gaseous fuel that can be added to the secondary vapor tank.

9. The method of claim 1, wherein the pumping includes activating a fuel pump, included in a gaseous fuel line upstream of the secondary vapor tank, to pump the gaseous fuel to the secondary vapor tank, wherein during the pumping the secondary fuel vapor tank comprises only a single inlet and no outlets, wherein the single inlet comprises the gaseous fuel line.

10. The method of claim 1, wherein enabling addition of liquid fuel to the fuel tank includes opening a refueling lock and receiving the liquid fuel in the fuel tank via a low pressure refueling port of a refueling conduit.

11. A method, comprising: storing a liquid fuel and a pressurized gaseous fuel, only partially dissolved in the liquid fuel, in a fuel tank; and
responsive to a liquid refueling request,
pumping gaseous fuel from the fuel tank into a secondary tank via a pump positioned upstream from the secondary tank before enabling addition of liquid fuel into the fuel tank when the fuel tank pressure is above a threshold, the threshold based on a volume of the secondary tank, and wherein during the pumping the secondary tank is fluidically isolated from atmosphere, and wherein the gaseous fuel comprises a first fuel type and the liquid fuel comprises a second fuel type chemically distinct from the first fuel type.

12. The method of claim 11, further comprising: enabling addition of liquid fuel into the fuel tank without prior pumping of the gaseous fuel from the fuel tank into the secondary tank when fuel tank pressure is below the threshold.

13. The method of claim 11, further comprising ceasing the pumping of gaseous fuel when the fuel tank pressure is below the threshold.

14. The method of claim 11, wherein the liquid fuel is received in the fuel tank via a low pressure refueling port of a refueling conduit, the low pressure refueling port distinct from a high pressure refueling port of the refueling conduit for receiving both pressurized gaseous fuel and a pre-pressurized mixture of the liquid fuel and gaseous fuel.

15. The method of claim 14, wherein enabling addition of the liquid fuel includes opening a refueling lock of the low pressure refueling port.

16. The method of claim 11, wherein the pump is coupled in a gaseous fuel line between the fuel tank and the secondary tank.

17. The method of claim 11, wherein the threshold is further based on an amount of gaseous fuel that can be added to the secondary tank.

* * * * *